US011927115B2

(12) United States Patent
Johansson et al.

(10) Patent No.: US 11,927,115 B2
(45) Date of Patent: Mar. 12, 2024

(54) GUIDE VANES IN A GAS TURBINE ENGINE

(71) Applicant: Siemens Energy Global GmbH & Co. KG., Munich (DE)

(72) Inventors: Bengt Johansson, Linköping (SE); Almir Ajkunic, Norrköping (SE); Ranjith Kumar Arinipalli, Finspång (SE); Antonio Pesare, Norrköping (SE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 18/042,462

(22) PCT Filed: Sep. 2, 2021

(86) PCT No.: PCT/US2021/071346
§ 371 (c)(1),
(2) Date: Feb. 22, 2023

(87) PCT Pub. No.: WO2022/051758
PCT Pub. Date: Mar. 10, 2022

(65) Prior Publication Data
US 2024/0026796 A1    Jan. 25, 2024

Related U.S. Application Data

(60) Provisional application No. 63/074,777, filed on Sep. 4, 2020.

(51) Int. Cl.
*F01D 9/06* (2006.01)
*F01D 9/04* (2006.01)

(52) U.S. Cl.
CPC ............ *F01D 9/065* (2013.01); *F01D 9/041* (2013.01); *F05D 2240/122* (2013.01);
(Continued)

(58) Field of Classification Search
CPC . F01D 9/065; F05D 2240/11; F05D 2260/204
See application file for complete search history.

(56) References Cited

U.S. PATENT DOCUMENTS

2017/0328237 A1* 11/2017 Bencini ................. F01D 25/32
2018/0106158 A1*  4/2018 Boeke .................... F01D 9/041
2018/0363486 A1   12/2018 Smoke et al.

OTHER PUBLICATIONS

PCT International Search Report and Written Opinion of International Searching Authority dated Feb. 14, 2022 corresponding to PCT International Application No. PCT/US2021/071346 filed Sep. 2, 2021.

* cited by examiner

*Primary Examiner* — Brian O Peters

(57) ABSTRACT

A guide vane in a gas turbine engine includes an inner platform, an outer platform, and an airfoil extending therebetween. Side surfaces of the inner platform and outer platform between an adjacent guide vane define a first seal slot, a second seal slot, and a third seal slot forming a closed loop having three corners. At least one of the corners is rounded. The guide vane includes tubulator ribs and pin fins disposed in an airfoil interior. The pin fins are disposed in a region of the trailing edge. The inner platform defines film cooling holes disposed at an outer surface facing the airfoil. The film cooling holes are arranged in a fan shape. An inner surface of the inner platform and an outer surface of the outer platform include impingement cooling ribs. The inner platform protrudes further towards upstream in a flow direction than the outer platform.

18 Claims, 8 Drawing Sheets

(52) U.S. Cl.
CPC ...... *F05D 2240/55* (2013.01); *F05D 2240/81* (2013.01); *F05D 2260/202* (2013.01); *F05D 2260/2212* (2013.01)

GUIDE VANES IN A GAS TURBINE ENGINE

BACKGROUND

An industrial gas turbine engine typically includes a compressor section, a turbine section, and a combustion section disposed therebetween. The compressor section includes multiple stages of rotating compressor blades and stationary compressor vanes. The combustion section typically includes a plurality of combustors.

The turbine section includes multiple stages of rotating turbine blades and stationary turbine vanes. Turbine blades and vanes often operate in a high temperature environment and are internally cooled.

BRIEF SUMMARY

A guide vane in a gas turbine engine includes: an inner platform including an outer surface, an inner surface, and a side surface; an outer platform including an outer surface, an inner surface and a side surface, the side surface of the outer platform defining a first outer seal slot, a second outer seal slot, and a third outer seal slot; an airfoil extending between the inner platform and the outer platform, the airfoil including a pressure sidewall and a suction sidewall meeting at a leading edge and a trailing edge, the pressure sidewall and the suction sidewall defining an airfoil interior. The second outer seal slot is spaced apart from the first outer seal slot and meets the first outer seal slot. The third outer seal slot extends between the first outer seal slot and the second outer seal slot. The first outer seal slot, the second outer seal slot, and the third outer seal slot forms a closed loop having three outer corners at the outer platform.

A guide vane in a gas turbine engine includes: an airfoil extending between an inner platform and an outer platform, the airfoil including a pressure sidewall and a suction sidewall meeting at a leading edge and a trailing edge, the pressure sidewall and the suction sidewall defining an airfoil interior; and a plurality of pin fins disposed in the airfoil interior, the plurality of pin fins being arranged in rows that extend between the leading edge and the trailing edge and in columns that extend between the inner platform and the outer platform for cooling of the airfoil interior.

A guide vane in a gas turbine engine includes: an airfoil extending between an inner platform and an outer platform, the airfoil including a pressure sidewall and a suction sidewall meeting at a leading edge and a trailing edge, the pressure sidewall and the suction sidewall defining an airfoil interior; an outer rib disposed at the outer surface of the outer platform configured to enable an impingement cooling of the outer platform; and an inner rib disposed at the inner surface of the inner platform configured to enable an impingement cooling of the inner platform.

A guide vane in a gas turbine engine includes: an outer platform including an outer surface, an inner surface, and a side surface; an inner platform including an outer surface, an inner surface, and a side surface; an airfoil extending between the inner platform and the outer platform, the airfoil including a pressure sidewall and a suction sidewall meeting at a leading edge and a trailing edge, the pressure sidewall and the suction sidewall defining an airfoil interior. The outer surface of the inner platform defines a plurality of film cooling holes for cooling of the inner platform.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
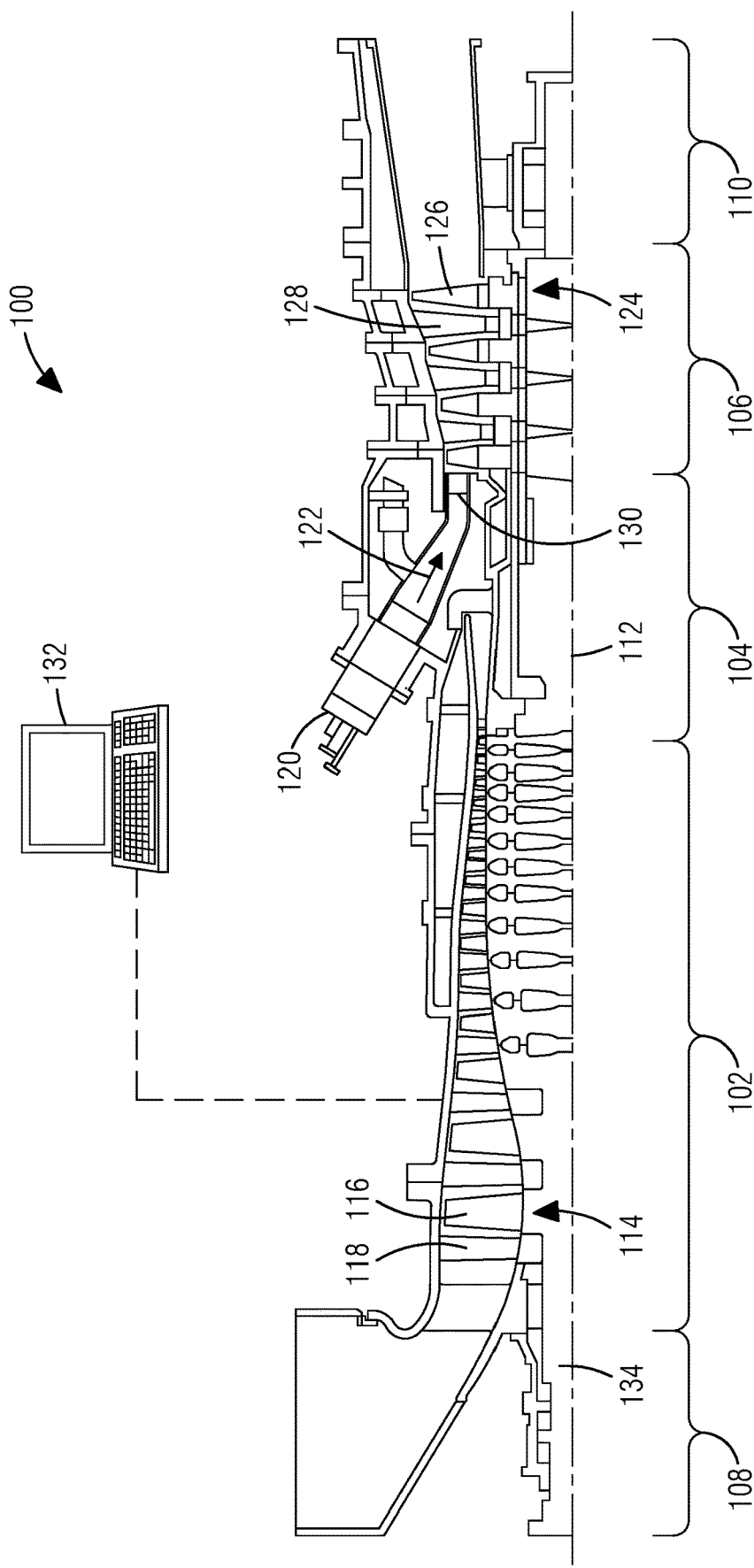
FIG. 1 is a longitudinal cross-sectional view of a gas turbine engine taken along a plane that contains a longitudinal axis or central axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including", "having", and "comprising" as well as derivatives thereof, mean inclusion without limitation. The singular forms "a", "an", and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith" as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates an example of a gas turbine engine 100 including a compressor section 102, a combustion section 104, and a turbine section 106 arranged along a central axis 112. The compressor section 102 includes a plurality of compressor stages 114 with each compressor stage 114 including a set of rotating blades 116 and a set of stationary vanes 118 or adjustable guide vanes. A rotor 134 supports the rotating blades 116 for rotation about the central axis 112 during operation. In some constructions, a single one-piece rotor 134 extends the length of the gas turbine engine 100 and is supported for rotation by a bearing at either end. In other constructions, the rotor 134 is assembled from several separate spools that are attached to one another or may include multiple disk sections that are attached via a bolt or plurality of bolts.

The compressor section 102 is in fluid communication with an inlet section 108 to allow the gas turbine engine 100 to draw atmospheric air into the compressor section 102. During operation of the gas turbine engine 100, the compressor section 102 draws in atmospheric air and compresses that air for delivery to the combustion section 104. The illustrated compressor section 102 is an example of one compressor section 102 with other arrangements and designs being possible.

In the illustrated construction, the combustion section 104 includes a plurality of separate combustors 120 that each operate to mix a flow of fuel with the compressed air from the compressor section 102 and to combust that air-fuel mixture to produce a flow of high temperature, high pressure combustion gases or exhaust gas 122. Of course, many other arrangements of the combustion section 104 are possible.

The turbine section 106 includes a plurality of turbine stages 124 with each turbine stage 124 including a number of rotating turbine blades 126 and a number of stationary turbine vanes 128. The turbine stages 124 are arranged to receive the exhaust gas 122 from the combustion section 104 at a turbine inlet 130 and expand that gas to convert thermal and pressure energy into rotating or mechanical work. The turbine section 106 is connected to the compressor section 102 to drive the compressor section 102. For gas turbine engines 100 used for power generation or as prime movers, the turbine section 106 is also connected to a generator, pump, or other device to be driven. As with the compressor section 102, other designs and arrangements of the turbine section 106 are possible.

An exhaust portion 110 is positioned downstream of the turbine section 106 and is arranged to receive the expanded flow of exhaust gas 122 from the final turbine stage 124 in the turbine section 106. The exhaust portion 110 is arranged to efficiently direct the exhaust gas 122 away from the turbine section 106 to assure efficient operation of the turbine section 106. Many variations and design differences are possible in the exhaust portion 110. As such, the illustrated exhaust portion 110 is but one example of those variations.

A control system 132 is coupled to the gas turbine engine 100 and operates to monitor various operating parameters and to control various operations of the gas turbine engine 100. In preferred constructions, the control system 132 is typically micro-processor based and includes memory devices and data storage devices for collecting, analyzing, and storing data. In addition, the control system 132 provides output data to various devices including monitors, printers, indicators, and the like that allow users to interface with the control system 132 to provide inputs or adjustments. In the example of a power generation system, a user may input a power output set point and the control system 132 may adjust the various control inputs to achieve that power output in an efficient manner.

The control system 132 can control various operating parameters including, but not limited to variable inlet guide vane positions, fuel flow rates and pressures, engine speed, valve positions, generator load, and generator excitation. Of course, other applications may have fewer or more controllable devices. The control system 132 also monitors various parameters to assure that the gas turbine engine 100 is operating properly. Some parameters that are monitored may include inlet air temperature, compressor outlet temperature and pressure, combustor outlet temperature, fuel flow rate, generator power output, bearing temperature, and the like. Many of these measurements are displayed for the user and are logged for later review should such a review be necessary.

Figure 2:
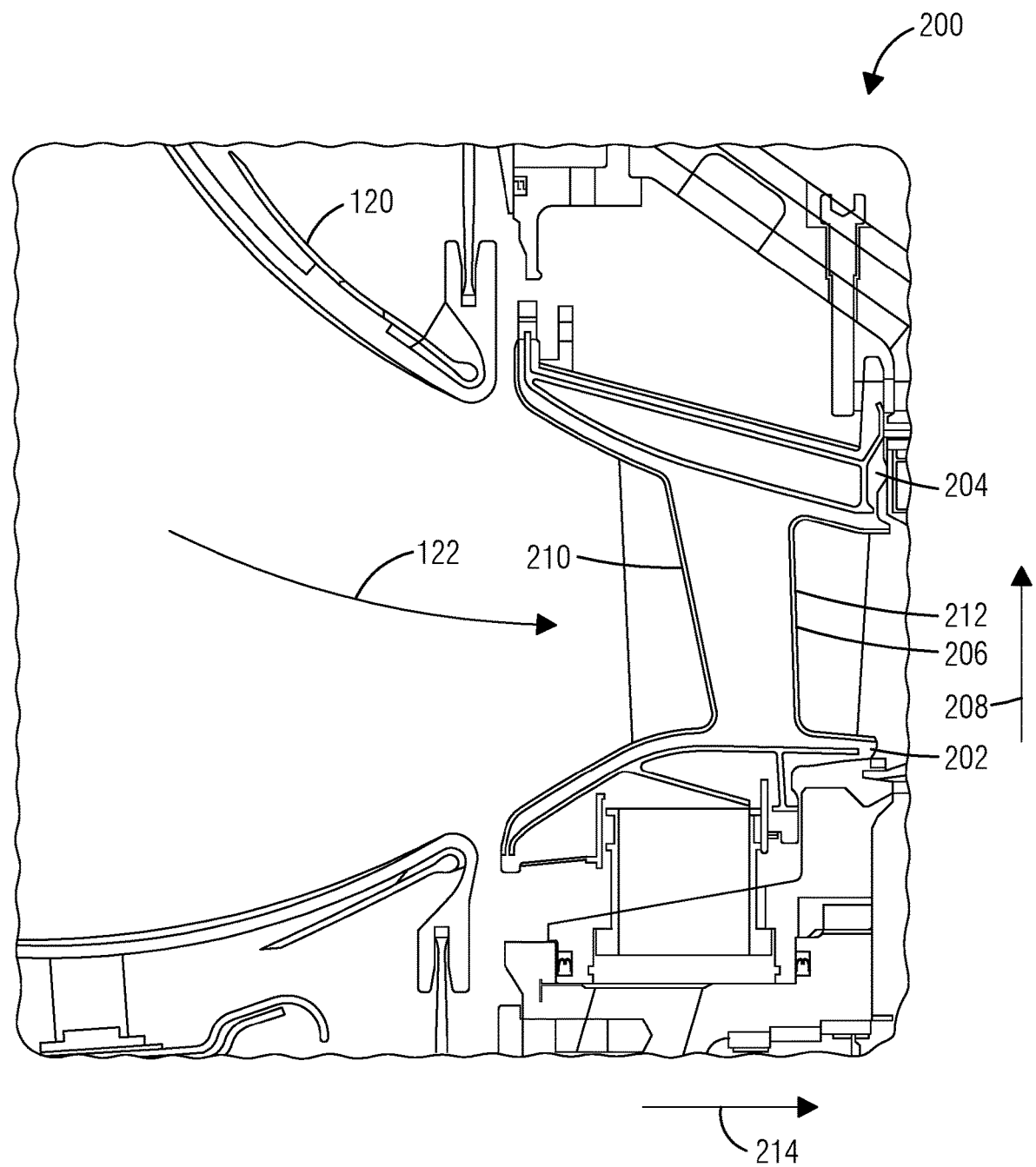
FIG. 2 is a longitudinal cross-sectional view of a guide vane.

FIG. 2 is a longitudinal cross-sectional view of a guide vane 200. The guide vane 200 is one of many guide vanes 200 that are arranged in a circumferential direction to define a row of stationary guide vanes 200. The guide vane 200 interfaces with the combustor 120 and is disposed near the turbine inlet 130 of the turbine section 106 in the gas turbine engine 100. The exhaust gas 122 from the combustor 120 enters the turbine section 106 through the guide vane 200.

The guide vane 200 includes an inner platform 202, an outer platform 204, and an airfoil 206 extending between the inner platform 202 and the outer platform 204 in a radial direction 208. The airfoil 206 includes a leading edge 210 and a trailing edge 212 in a longitudinal direction 214 that is parallel to a flow direction of the exhaust gas 122. The inner platform 202 protrudes further towards the combustor 120 than the outer platform 204. The further protruding inner platform 202 interfaces to the combustor 120 to reduce leakage of the exhaust gas 122 from the combustor 120.

Figure 3:
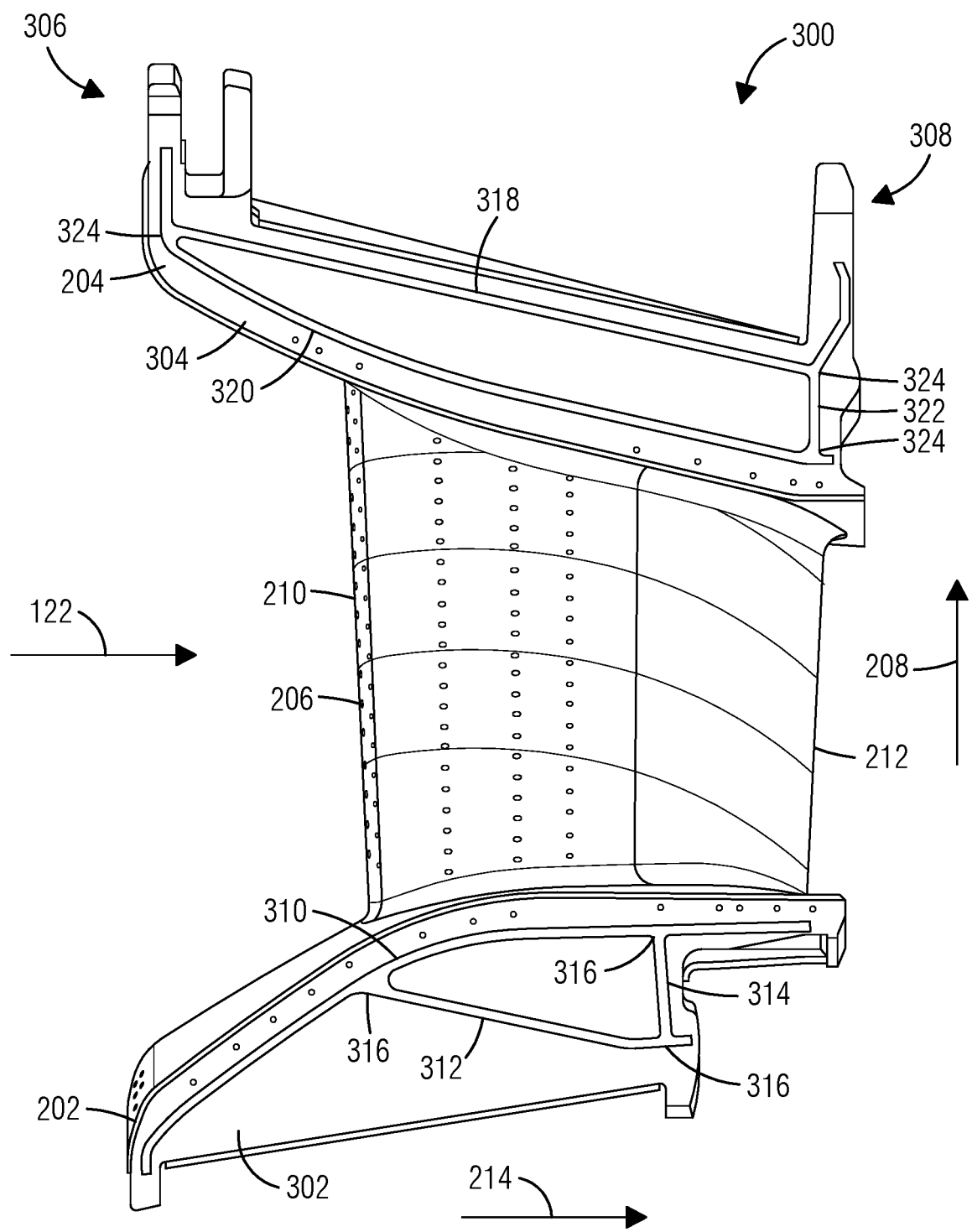
FIG. 3 is a front view of a guide vane.

FIG. 3 is a front view of a guide vane 300. The guide vane 300 has an upstream side 306 and a downstream side 308 in the longitudinal direction 214 that is generally parallel to the flow direction of the exhaust gas 122. The inner platform 202 includes a side surface 302. The outer platform 204 includes a side surface 304. The side surface 302 of the inner platform 202 and the side surface 304 of the outer platform 204 are surfaces between an adjacent guide vane 300 that is arranged in the circumferential direction.

The side surface 302 of the inner platform 202 extends in the longitudinal direction 214 between the upstream side 306 and the downstream side 308. The side surface 302 includes a first inner seal slot 310 that extends between the upstream side 306 and the downstream side 308. The side surface 302 includes a second inner seal slot 312 that extends between the upstream side 306 and the downstream side 308. The second inner seal slot 312 meets the first inner seal slot 310 at the upstream side 306. The side surface 302 includes a third inner seal slot 314 that extends between the second inner seal slot 312 and the first inner seal slot 310 at the downstream side 308. The first inner seal slot 310, the second inner seal slot 312, and the third inner seal slot 314 form a closed loop. Seal strips may be placed in the first inner seal slot 310, the second inner seal slot 312, and the third inner seal slot 314 to form a seal between adjacent guide vanes 300.

At least one of the first inner seal slot 310, the second inner seal slot 312, and the third inner seal slot 314 has a straight shape to place a straight shaped seal strip. At least one of the first inner seal slot 310, the second inner seal slot 312, and the third inner seal slot 314 has a curved shape. As illustrated in FIG. 3, the second inner seal slot 312 and the third inner seal slot 314 may be straight. The first inner seal slot 310 may be curved. It is possible that the first inner seal slot 310, the second inner seal slot 312, and the third inner seal slot 314 may have any suitable configurations.

The first inner seal slot 310 has a constant width lengthwise. The second inner seal slot 312 has a constant width lengthwise. The third inner seal slot 314 has a constant width lengthwise. The width of the first inner seal slot 310, the width of the second inner seal slot 312, and the width of the third inner seal slot 314 are the same. In other constructions, the width of the first inner seal slot 310, the width of the second inner seal slot 312, and the width of the third inner seal slot 314 may be different. It is also possible that at least one of the first inner seal slot 310, the second inner seal slot 312, and the third inner seal slot 314 has a variable width lengthwise. The width of the first inner seal slot 310, the width of the second inner seal slot 312, and the width of the third inner seal slot 314 is designed to place a seal strip that has a high temperature difference for a durability of the seal strip.

Three inner corners 316 are formed at intersections between the first inner seal slot 310 and the second inner seal slot 312, between the second inner seal slot 312 and the third inner seal slot 314, and between the third inner seal slot 314 and the first inner seal slot 310. At least one inner corner 316 of the three inner corners 316 is rounded. The inner corner 316 may be rounded in two side, e.g., a side facing to an interior of the closed loop, and a side face away from the interior of the closed loop. It is possible that the inner corner 316 is only rounded in one side. The inner corners 316 define a width that is greater than the width of the first inner seal slot 310, second inner seal slot 312, and third inner seal slot 314 that leads a variable width of each of the first inner seal slot 310, the second inner seal slot 312, and the third inner seal slot 314. The variable width of each of the first inner seal slot 310, the second inner seal slot 312, and the third inner seal slot 314 allows the guide vane 300 to tilt during transient and reduce damage of seal strips in the first inner seal slot 310, second inner seal slot 312, and third inner seal slot 314.

The side surface 304 of the outer platform 204 extends in the longitudinal direction 214 between the upstream side 306 and the downstream side 308. The side surface 304 includes a first outer seal slot 318 that extends between the upstream side 306 and the downstream side 308. The side surface 304 includes a second outer seal slot 320 that extends between the upstream side 306 and the downstream side 308. The second outer seal slot 320 meets the first outer seal slot 318 at the upstream side 306. The side surface 304 includes a third outer seal slot 322 that extends between the second outer seal slot 320 and the first outer seal slot 318 at the downstream side 308. The first outer seal slot 318, the second outer seal slot 320, and the third outer seal slot 322 form a closed loop. Seal strips may be placed in the first outer seal slot 318, the second outer seal slot 320, and the third outer seal slot 322 to form a seal between adjacent guide vanes 300.

At least one of the first outer seal slot 318, second outer seal slot 320, and the third outer seal slot 322 has a straight shape to place a straight shaped seal strip. At least one of the first outer seal slot 318, second outer seal slot 320, and the third outer seal slot 322 has a curved shape. As illustrated in FIG. 3, the first outer seal slot 318 and the third outer seal slot 322 are straight. The second outer seal slot 320 is curved. It is possible that the first outer seal slot 318, the second outer seal slot 320, and the third outer seal slot 322 may have any suitable configurations.

The first outer seal slot 318 has a constant width lengthwise. The second outer seal slot 320 has a constant width lengthwise. The third outer seal slot 322 has a constant width lengthwise. The width of the first outer seal slot 318, the width of the second outer seal slot 320, and the width of the third outer seal slot 322 are the same. In other constructions, the width of the first outer seal slot 318, the width of the second outer seal slot 320, and the width of the third outer seal slot 322 may be different. It is also possible that at least one of the first outer seal slot 318, the second outer seal slot 320, and the third outer seal slot 322 has a variable width lengthwise. The width of the first outer seal slot 318, the width of the second outer seal slot 320, and the width of the third outer seal slot 322 is designed to place a seal strip that has a high temperature difference for a durability of the seal strip.

Three outer corners 324 are formed at intersections between the first outer seal slot 318 and the second outer seal slot 320, between the second outer seal slot 320 and the third outer seal slot 322, and between the third outer seal slot 322 and the first outer seal slot 318. At least one outer corner 324 of the three outer corners 324 is rounder. The outer corner 324 may be rounded in two sides, e.g., a side facing to an interior of the closed loop, and a side facing away from the interior of the closed loop. It is possible that the outer corner 324 is only rounded in one side. The outer corners 324 define a width that is greater than the width of the first outer seal slot 318, the second outer seal slot 320, and the third outer seal slot 322 that leads a variable width of each of the first outer seal slot 318, the second outer seal slot 320, and the third outer seal slot 322. The variable width of each of the first outer seal slot 318, the second outer seal slot 320, and the third outer seal slot 322 allows the guide vane 300 to tilt during transient and reduce damage of seal strips in the first outer seal slot 318, the second outer seal slot 320, and the third outer seal slot 322.

Figure 4:
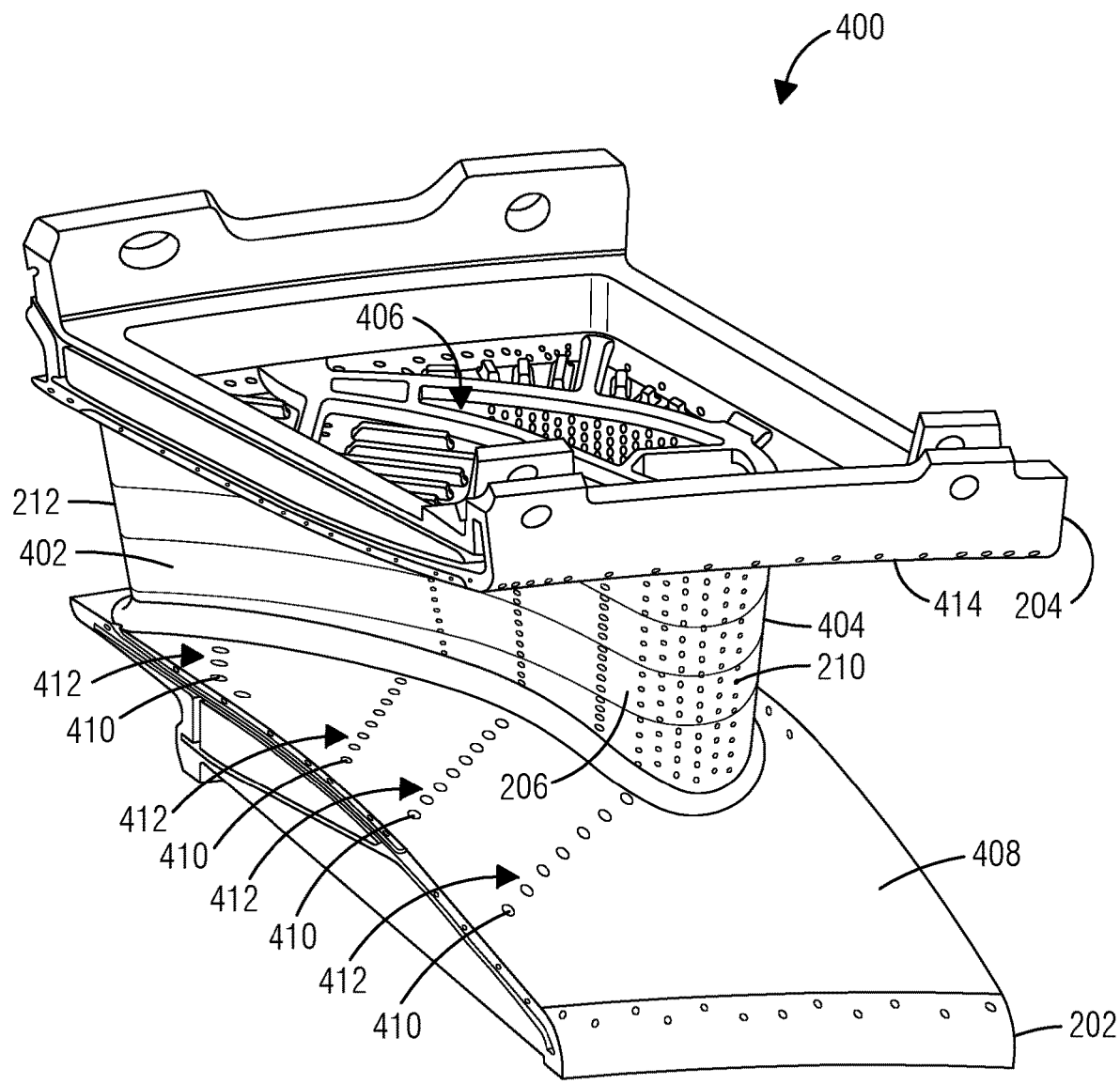
FIG. 4 is a perspective view of a guide vane.

FIG. 4 is a perspective view of a guide vane 400. FIG. 4 may be the perspective view of the guide vane 300 as illustrated in FIG. 3. The airfoil 206 includes a pressure sidewall 402 and a suction sidewall 404 meeting at the leading edge 210 and the trailing edge 212. The pressure sidewall 402 and suction sidewall 404 define an airfoil interior 406.

The inner platform 202 has an outer surface 408 facing to the outer platform 204. The outer surface 408 includes a plurality of film cooling holes 410. The film cooling holes 410 are arranged in multiple rows 412. The multiple rows 412 are arranged as a fan shape. The fan shape has an outer diameter toward the airfoil 206. The fan shaped film cooling holes 410 provide cooling of the inner platform 202.

The outer platform 204 may have a similar configuration as the inner platform 202. The outer platform 204 has an inner surface 414 facing the inner platform 202. The inner surface 414 may include a plurality of film cooling holes 410 (not shown in FIG. 4) that are arrange in multiple rows 412. The multiple rows 412 are arranged as a fan shape. The fan shape has an outer diameter toward the airfoil 206. The fan shaped film cooling holes 410 provide cooling of the outer platform 201.

Figure 5:
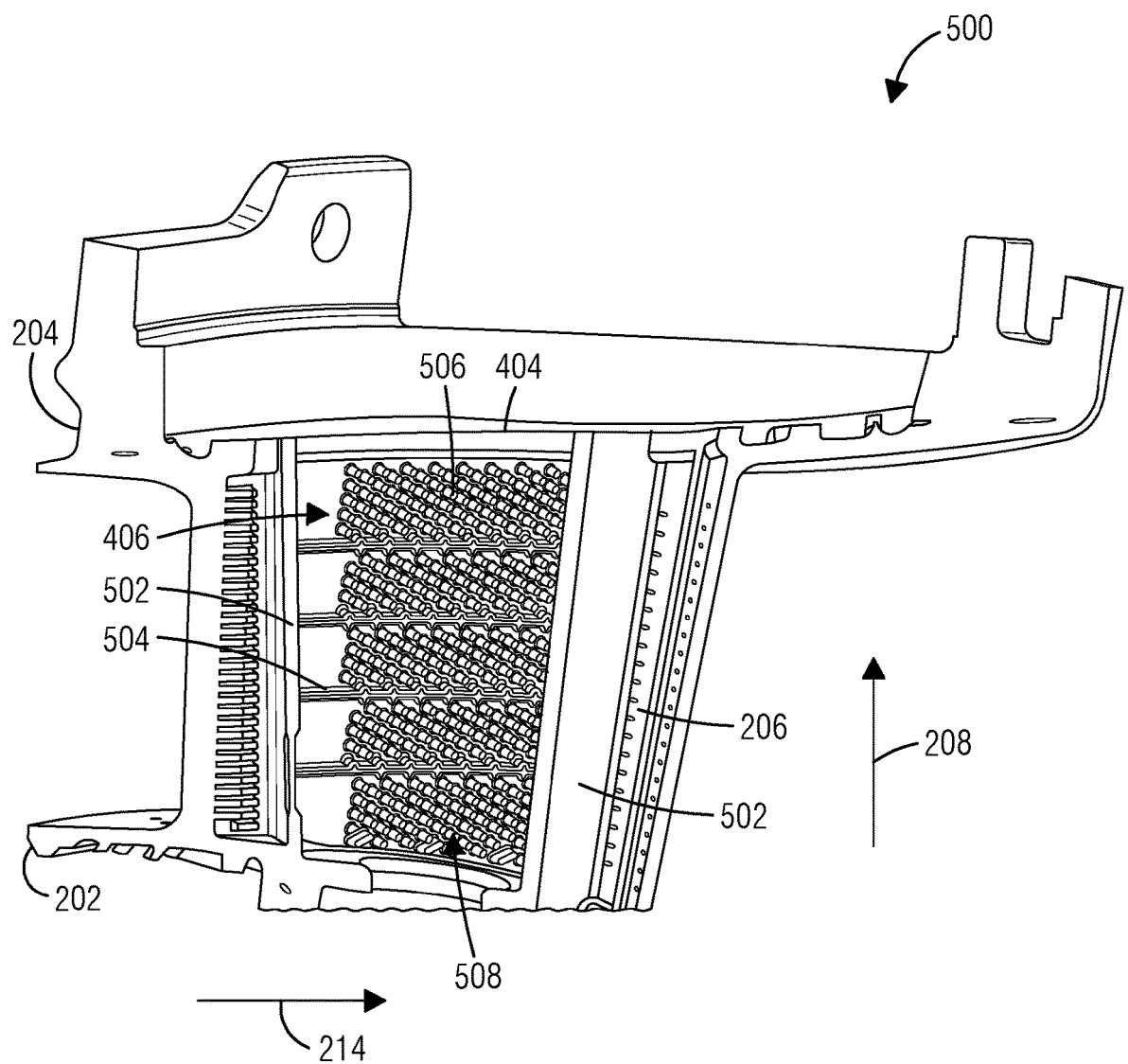
FIG. 5 is a perspective cut away view of a part of a guide vane.

FIG. 5 is perspective cut away view of a part of a guide vane 500. The guide vane 500 includes partition walls 502 disposed in the airfoil interior 406. The partition walls 502 extend between the inner platform 202 and the outer platform 204 and are spaced apart from one another in the longitudinal direction 214. Two partition walls 502 are showed in FIG. 5. The partition walls 502 are coupled to the pressure sidewall 402 and the suction sidewall 404 (not shown in FIG. 5). An internal cooling channel 508 is defined by the partition walls 502, the pressure sidewall 402, and the suction sidewall 404 within the airfoil interior 406. FIG. 5 only shows one internal cooling channel 508 of the guide vane 500. The guide vane 500 includes a plurality of partition walls 502 between the leading edge 210 and the trailing edge 212 that define a plurality of internal cooling channels 508 therebetween.

At least one tubulator rib 504 is disposed in the airfoil interior 406. The tubulator rib 504 extends between the partition walls 502 in the longitudinal direction 214. As shown in FIG. 5, a plurality of turbulator rib 504 are disposed between the partition walls 502. The turbulator ribs 504 are spaced apart from each other in the radial direction 208. The turbulator ribs 504 improve cooling in the internal cooling channel 508.

A plurality of pin fins 506 are disposed in the airfoil interior 406. The pin fins 506 are disposed on an inner surface of the suction sidewall 404. The pin fins 506 are also disposed on an inner surface of the pressure sidewall 402 (not shown in FIG. 5). The pin fins 506 are arranged in rows that extend between the spaced apart partition walls 502 in the longitudinal direction 214 and in columns that extend between the inner platform 202 and the outer platform 204 in the radial direction 208. The combination of the pin fins 506 and the turbulator ribs 504 improves cooling in the internal cooling channel 508.

Figure 6:
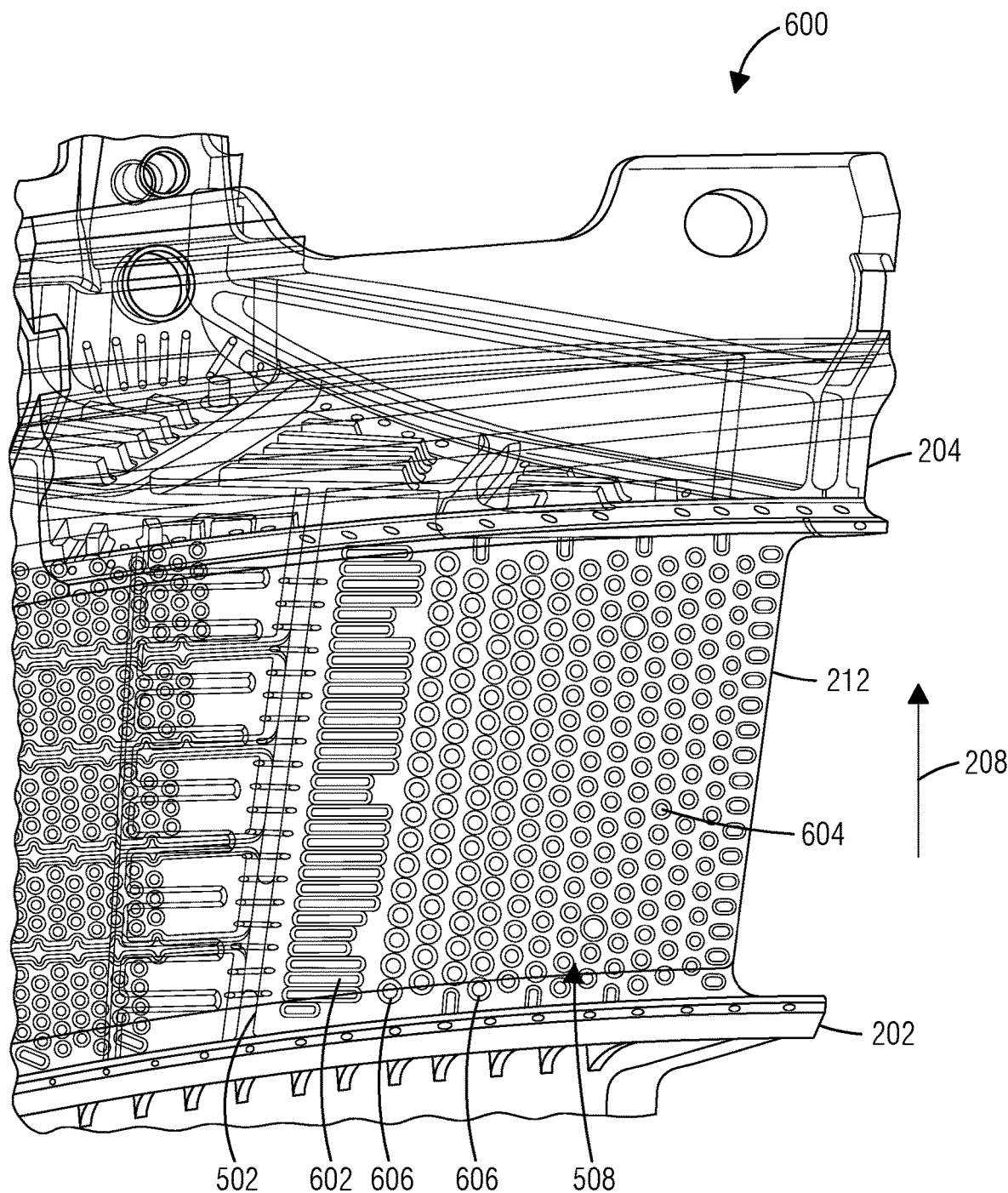
FIG. 6 is a transparent front view of a part of a guide vane.

FIG. 6 is a transparent front view of a part of a guide vane 600. The guide vane 600 includes an internal cooling channel 508 in a region of the trailing edge 212. A plurality of turbulator ribs 602 are disposed in the internal cooling channel 508 in the region of the trailing edge 212. The turbulator ribs 602 are disposed downstream of the partition wall 502 and extend toward the trailing edge 212. The turbulator ribs 602 have different configurations. For example, some of the turbulator ribs 602 extend more towards the trailing edge 212. It is possible that the turbulator ribs 602 may have the same configuration or any suitable configurations.

A plurality of pin fins 604 are disposed in the internal cooling channel 508 in the region of the trailing edge 212. The pin fins 604 are arranged in more than one rows 606. The rows 606 extend toward the trailing edge 212. Each row 606 includes a number of pin fins 604 that extend between the inner platform 202 and the outer platform 204 and spaced apart from one another forming more than one columns. Each of the pin fins 604 in a row 606 may have the same configuration or may have different configurations as desired. For example, some pin fins 604 may have different diameters than other pin fins 604 in the same row 606. The pin fins 604 in different rows 606 may have different configurations. The pin fins 604 in adjacent rows 606 may be arranged staggered in the radial direction 208. The combination of the pin fins 604 and the turbulator ribs 602 improves cooling in the internal cooling channel 508 in the region of the trailing edge 212.

Figure 7:
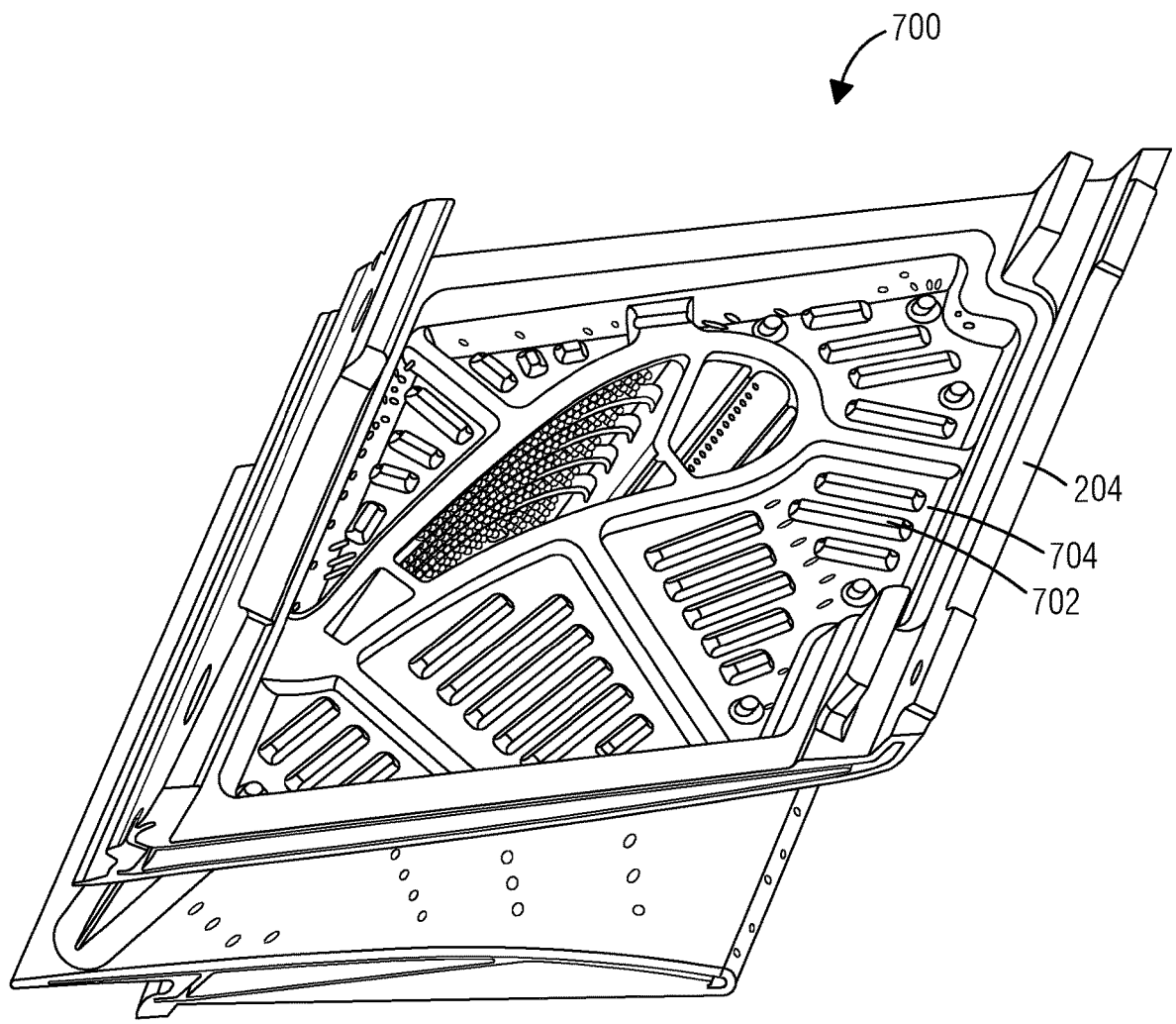
FIG. 7 is a perspective top view of a guide vane.

FIG. 7 is a perspective top view of a guide vane 700. The guide vane 700 includes outer ribs 702 disposed on an outer surface 704 of the outer platform 204. The outer ribs 702 may have different configurations, such as different lengths, widths, heights, or orientations with respect to one another. Some of the outer ribs 702 are arranged in a row and parallel to each other. The outer ribs 702 provide impingement cooling to the outer platform 204.

Figure 8:
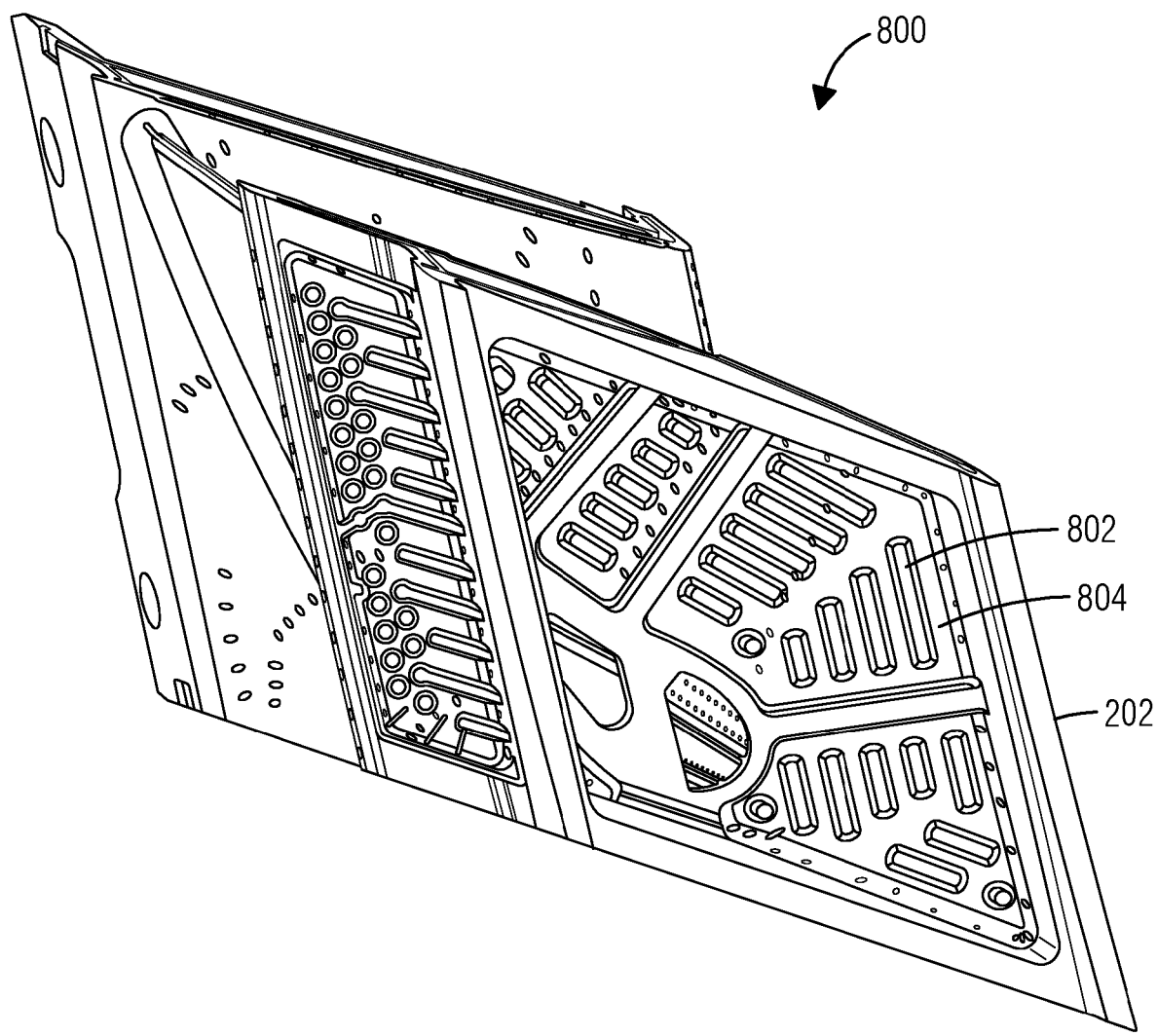
FIG. 8 is a perspective bottom view of a guide vane.

FIG. 8 is a perspective bottom view of a guide vane 800. The guide vane 800 includes inner ribs 802 disposed on an inner surface 804 of the inner platform 202. The inner ribs 802 may have different configurations, such as different lengths, widths, heights, or orientations with respect to one another. Some of the inner ribs 802 are arranged in a row and parallel to each other. The inner ribs 802 provide impingement cooling to the inner platform 202.

It should be noted that FIGS. 1-8 illustrate many features of a guide vane and these features can be used together or separate from one another on any guide vane. Thus, there is no requirement that the guide vane include any or all of the features and there is no limit to the combinations of features for a particular design.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

LISTING OF DRAWING ELEMENTS 100 gas turbine engine
102 compressor section
104 combustion section
106 turbine section
108 inlet section
110 exhaust portion
112 central axis
114 compressor stage
116 rotating blade
118 stationary vane
120 combustor
122 exhaust gas
124 turbine stage
126 rotating turbine blade
128 stationary turbine vane
130 turbine inlet
132 control system
134 rotor
200 guide vane
202 inner platform 204 outer platform
206 airfoil
208 radial direction
210 leading edge
212 trailing edge
214 longitudinal direction
300 guide vane
302 side surface
304 side surface
306 upstream side
308 downstream side
310 first inner seal slot
312 second inner seal slot
314 third inner seal slot
316 inner corner
318 first outer seal slot
320 second outer seal slot
322 third outer seal slot
324 outer corner
400 guide vane
402 pressure sidewall
404 suction sidewall
406 airfoil interior
408 outer surface
410 film cooling holes
412 row
414 inner surface
500 guide vane
502 partition wall
504 tubulator rib
506 pin fins
508 internal cooling channel
600 guide vane
602 tubulator rib
604 pin fins
606 row
700 guide vane
702 outer rib
704 outer surface
800 guide vane
802 inner rib
804 inner surface

What is claimed is:

1. A guide vane in a gas turbine engine, the guide vane comprising: an inner platform comprising an outer surface, an inner surface, and a side surface; an outer platform comprising an outer surface, an inner surface and a side surface, the side surface of the outer platform defining a first outer seal slot, a second outer seal slot, and a third outer seal slot; an airfoil extending between the inner platform and the outer platform, the airfoil comprising a pressure sidewall and a suction sidewall meeting at a leading edge and a trailing edge, the pressure sidewall and the suction sidewall defining an airfoil interior, wherein the second outer seal slot is spaced apart from the first outer seal slot and meets the first outer seal slot, wherein the third outer seal slot extends between the first outer seal slot and the second outer seal slot, and wherein the first outer seal slot, the second outer seal slot, and the third outer seal slot forms a closed loop having three outer corners at the outer platform, wherein the side surface of the inner platform defines a first inner seal slot, a second inner seal slot, and a third inner seal slot, wherein the second inner seal slot is spaced apart from the first inner seal slot and meets the first inner seal slot, wherein the third inner seal slot extends between the first inner seal slot and the second inner seal slot, and wherein the first inner seal slot, the second inner seal slot, and the third inner seal slot forming a closed loop having three inner corners at the inner platform.

2. The guide vane of claim 1, wherein at least one of the three outer corners at the outer platform is rounded.

3. The guide vane of claim 1, wherein at least one of the three inner corners at the inner platform is rounded.

4. The guide vane of claim 1, wherein the outer surface of the inner platform defines film cooling holes.

5. The guide vane of claim 4, wherein the film cooling holes are arranged in a fan shape.

6. The guide vane of claim 5, wherein the fan shape has an outer diameter towards the airfoil.

7. The guide vane of claim 1, wherein the airfoil interior comprises at least one tubulator rib and pin fins.

8. The guide vane of claim 7, wherein the pin fins form an array having rows that extend between the leading edge and the trailing edge and columns that extend between the inner platform and the outer platform.

9. The guide vane of claim 1, wherein the airfoil interior comprises pin fins disposed in a region of the trailing edge.

10. The guide vane of claim 1, wherein the outer surface of the outer platform comprises at least one outer rib.

11. The guide vane of claim 1, wherein the inner surface of the inner platform comprises at least one inner rib.

12. The guide vane of claim 1, wherein the inner platform protrudes further towards to an upstream than the outer platform in a flow direction.

13. A guide vane in a gas turbine engine, the guide vane comprising: an airfoil extending between an inner platform and an outer platform, the airfoil comprising a pressure sidewall and a suction sidewall collectively meeting at a leading edge and a trailing edge, the pressure sidewall and the suction sidewall defining an airfoil interior; and a plurality of pin fins disposed in the airfoil interior, the plurality of pin fins being arranged in rows that extend between the leading edge and the trailing edge and in columns that extend between the inner platform and the outer platform for cooling of the airfoil interior, wherein the inner platform comprising an outer surface, an inner surface, and a side surface, and wherein the side surface of the inner platform defines a first inner seal slot, a second inner seal slot, and a third inner seal slot, wherein the second inner seal slot is spaced apart from the first inner seal slot and meets the first inner seal slot, wherein the third inner seal slot extends between the first inner seal slot and the second inner seal slot, and wherein the first inner seal slot, the second inner seal slot, and the third inner seal slot forming a closed loop having three inner corners at the inner platform.

14. The guide vane of claim 13, wherein the plurality of pin fins are disposed in a region of the trailing edge.

15. The guide vane of claim 13, wherein the airfoil interior comprises at least one tubulator rib.

16. A guide vane in a gas turbine engine, the guide vane comprising: an outer platform comprising an outer surface, an inner surface, and a side surface; an inner platform comprising an outer surface, an inner surface, and a side surface; an airfoil extending between the inner platform and the outer platform, the airfoil comprising a pressure sidewall and a suction sidewall meeting at a leading edge and a trailing edge, the pressure sidewall and the suction sidewall defining an airfoil interior; and wherein the outer surface of the inner platform defines a plurality of film cooling holes for cooling of the inner platform, wherein the side surface of the inner platform defines a first inner seal slot, a second inner seal slot, and a third inner seal slot, wherein the second inner seal slot is spaced apart from the first inner seal slot and meets the first inner seal slot, wherein the third inner seal slot extends between the first inner seal slot and the second inner seal slot, and wherein the first inner seal slot, the second inner seal slot, and the third inner seal slot forming a closed loop having three inner corners at the inner platform.

17. The guide vane of claim 16, wherein the plurality of film cooling holes are arranged in a fan shape.

18. The guide vane of claim 17, wherein the fan shape has an outer diameter toward the airfoil.

* * * * *